Sept. 13, 1927.  1,642,490
A. G. DECKER
PORTABLE POWER DRIVEN SCREW DRIVER AND WRENCH CLUTCH CUP
Filed Oct. 9, 1926
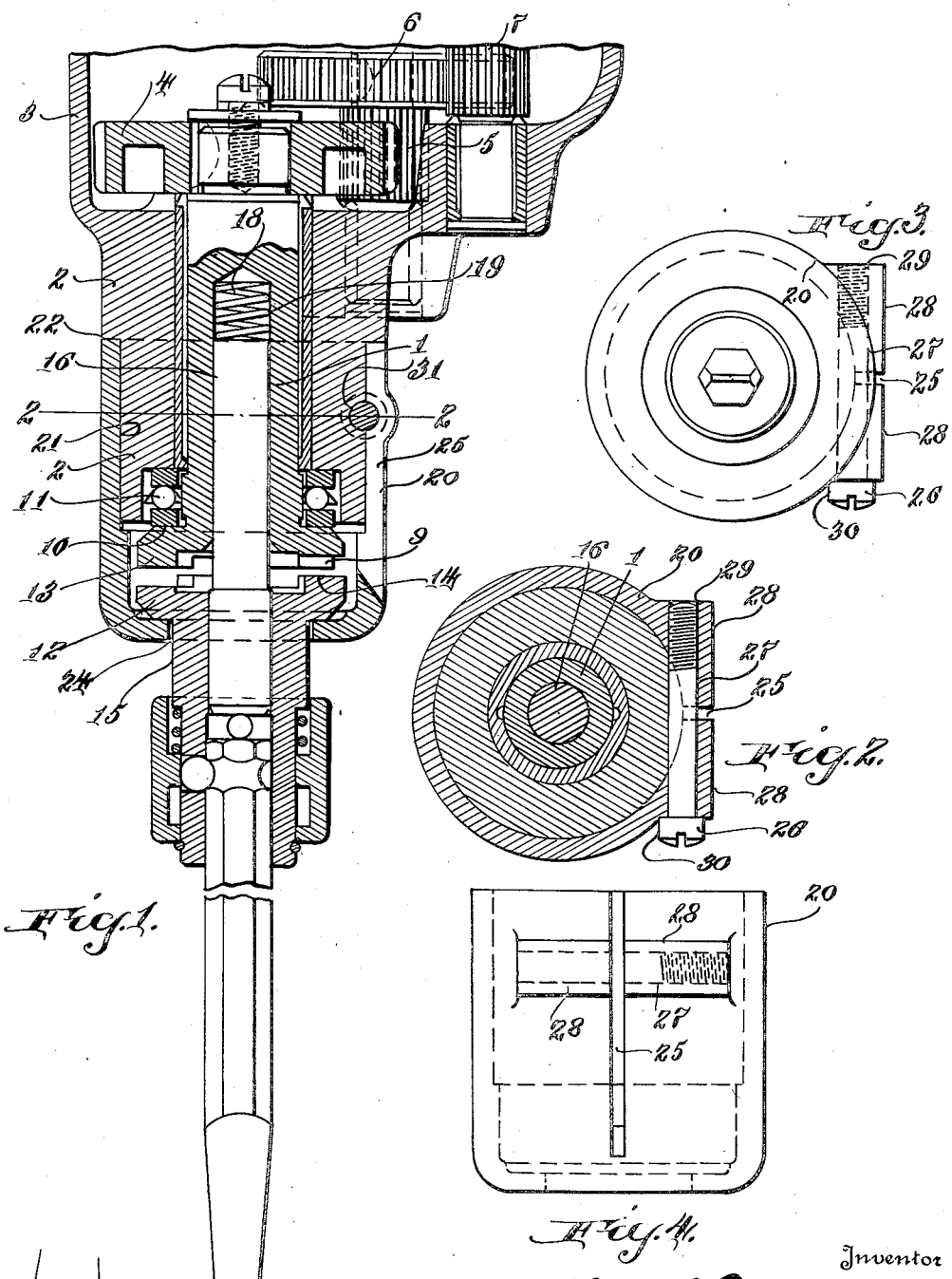

Patented Sept. 13, 1927.

1,642,490

UNITED STATES PATENT OFFICE.

ALONZO G. DECKER, OF BALTIMORE COUNTY, MARYLAND, ASSIGNOR TO THE BLACK & DECKER MANUFACTURING COMPANY, OF TOWSON, MARYLAND, A CORPORATION OF MARYLAND.

PORTABLE POWER-DRIVEN SCREW DRIVER AND WRENCH-CLUTCH CUP.

Application filed October 9, 1926. Serial No. 140,479.

The invention relates to a portable power driven tool of the screw driver or wrench type having a spindle rotarily supported in and by a bearing in an extension of the tool casing. The spindle has at its lower extremity one or more clutch teeth. These teeth are engaged in operation by a cooperating clutch member secured to or formed on the tool shaft or chuck. When released one clutch member is supported in a cup which fits over the projecting portion of the casing and the chuck member or tool shaft projects through the cup. A spring is preferably provided to assist in the disengagement of the clutch and the clutch parts are brought into engagement by pressure of the tool against the work, overcoming the tension of the spring. The type of clutch is, however, not material to the invention.

The cup, or ferrule, which has previously been used in this connection, was held in position by a number of small radial screws, which gave trouble in service due to the loosening of the screws by the vibration of the tool in operation.

The object of the present invention is to eliminate this difficulty.

In the accompanying drawing I have illustrated so much of a portable power driven screw driver as is necessary to the comprehension of the device of the invention and the manner of applying the same.

In the drawings:

Figure 1 is a section through the axis of the spindle of an electric screw driver showing the spindle and gearing, the upper portion of the tool, i. e., the motor casing, being broken away for convenience of illustration.

Figure 2 is a section on the line 2—2 of Figure 1.

Figure 3 is a bottom plan showing the screw driver bit, spindle and cup looking upward from beneath the tool as shown in Figure 1.

Figure 4 is an elevation of the cup or ferrule looking at the same from the right in Figure 1.

Referring to the drawings by numerals, each of which is used to indicate the same or similar parts in the different figures, the mechanism as shown comprises a hollow spindle 1 mounted to rotate and having a bearing in a bearing extension or boss 2 of the tool casing 3 of an electric or other power driven portable screw driver or wrench. This spindle, as shown, has secured to its upper end a toothed gear 4, which is the end gear of a train of gears 5, 6 and 7, by which the spindle is driven from an electric or other motor, not shown. The hollow spindle 1 is provided at its lower extremity with clutch teeth 9 downwardly disposed and spaced outwardly from the center so that the spindle is most conveniently formed with a shoulder 10 above the teeth, which shoulder rests against a thrust bearing 11 seated in the lower end of the projecting bearing portion of the casing, otherwise referred to as boss 2.

A second clutch member 12 cooperates with the clutch member 13 on the hollow spindle and has upwardly disposed teeth 14 adapted to engage the teeth 9 of the first mentioned clutch member. The lower clutch member 12 is formed on, or otherwise rigidly connected to the tool, preferably through tool shaft or chuck shaft 15 of any preferred design and the lower clutch member 12 is centered and aligned and normally thrust downwardly out of engagement by means of a centering pin 16 which projects upwardly inside the hollow spindle, the pin being engaged at its upper end by a helical compression spring 18 seated in the upper end of the hollow or bore 19 within the spindle.

The lower clutch member 12 and the chuck member or tool shaft carried thereby, are supported in the disengaged position of the chuck by means of a clutch cup or ferrule 20 enclosing and fitting the lower end of the projecting portion 2 of the tool casing which, in the form shown, is turned or reduced in diameter as to its lower portion at 21 to receive the cup, the upper edge of which rests against a shoulder 22 at the upper edge of the reduced portion. The clutch cup is apertured centrally of its bottom or end portion at 24 to enclose the tool shaft or chuck shaft below the lower clutch member, the latter, as aforesaid, resting in disengaged position on the bottom of the cup.

The cup 20, which may be either a casting or stamping, is made of a diameter to give a neat fit of the cup over the turned or reduced portion 21 of the hub or extension 2 and this ferrule or cup is slotted as to one wall preferably parallel to the axis at 25 so that it may be tightened about the hub or frame extension, being provided with a pinch screw 26 for this purpose, the same being seated in a hole or aperture 27 passing through the bosses 28 on each side of the slot, the hole being threaded at one end at 29 and the screw being correspondingly threaded at one end and having a slotted head 30 at the other end. The ferrule is tightened about the hub by turning the screw, applying tension thereto and closing the slot to a greater or less degree.

In the preferred form the screw is so placed as to intersect the hub, a groove 31 being milled across a projecting arc of the hub in line with the screw in the seated position of the cup, for this purpose. The screw being passed through the bosses 28 on the cup at each side of the slot and also through the groove 31 in the hub and tightened, holds the cup in position both by the external pressure of the cup against the surface of the hub and by the bearing of the screw against the sides of the grooves 31 in the direction of the axis of the hub and tool. The groove is not regarded as absolutely necessary, but in case the ferrule should become loose on the hub the groove 31 and screw would provide an unfailing means for holding it in place.

I have thus described specifically the preferred form of the invention in order that the nature and operation of the same may be clearly understood, however, the specific terms herein are used descriptively rather than in a limiting sense, the scope of the invention being defined in the claims.

What I claim and desire to secure by Letters Patent is:

1. In a portable power driven tool having a casing with a projecting spindle bearing member, a spindle rotating in said bearing member, a tool shaft aligned with said spindle, a clutch for connecting said members, a cup enclosing the clutch to support one clutch member when disengaged and fitting the bearing member, the cup being apertured at the bottom to pass the tool shaft and being slotted longitudinally, means transverse to the slot engaging the cup on both sides of the slot for closing the latter, causing the cup to grip the hub.

2. In a portable power driven tool having a casing with a projecting spindle bearing member, a spindle rotating in said bearing member, a tool shaft aligned with said spindle, a clutch for connecting said spindle and shaft and normally disengaged, a cup enclosing the clutch to support one clutch member when disengaged and fitting the projecting bearing member, the cup being apertured at the bottom to pass the tool shaft and being slotted longitudinally, means transverse to the slot engaging the cup on both sides of the slot for closing the latter, causing the cup to grip the bearing member, the latter being apertured to receive the transverse means which projects into said aperture, preventing longitudinal motion of the cup.

Signed by me at Towson, Maryland, this 2nd day of October, 1926.

ALONZO G. DECKER.